No. 758,009. PATENTED APR. 19, 1904.
E. C. KIRK.
APPARATUS FOR RETAINING HEAT IN FOODS.
APPLICATION FILED JAN. 14, 1904.
NO MODEL.
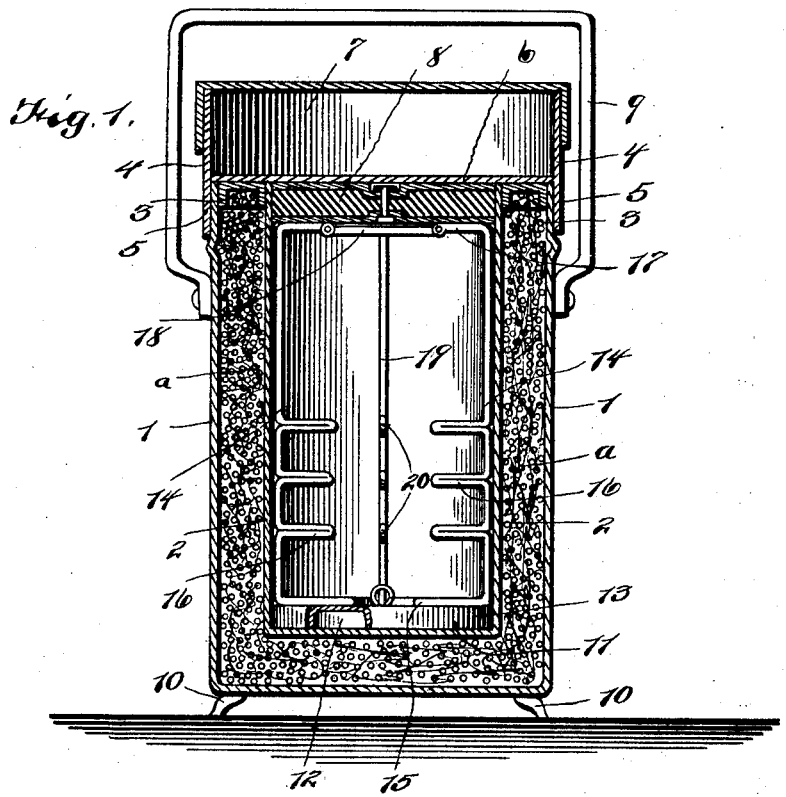
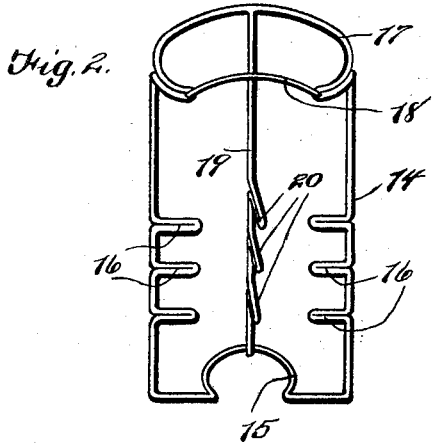
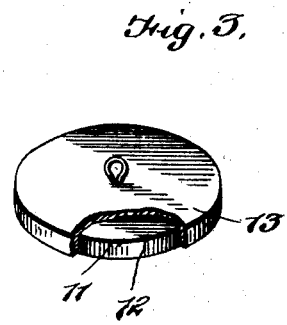
Witnesses
R. A. Boswell.
F. T. F. Johnson
Inventor
Edward C. Kirk,
By J. R. Nottingham
Attorney No. 758,009.

Patented April 19, 1904.

UNITED STATES PATENT OFFICE.

EDWARD C. KIRK, OF PITTSBURG, PENNSYLVANIA, ASSIGNOR OF ONE-HALF TO HYLAND C. KIRK, OF PITTSBURG, PENNSYLVANIA.

APPARATUS FOR RETAINING HEAT IN FOODS.

SPECIFICATION forming part of Letters Patent No. 758,009, dated April 19, 1904.

Application filed January 14, 1904. Serial No. 189,013. (No model.)

*To all whom it may concern:*

Be it known that I, EDWARD C. KIRK, a citizen of the United States, residing at Pittsburg, in the county of Allegheny and State of Pennsylvania, have invented certain new and useful Improvements in Apparatus for Retaining Heat in Foods; and I do hereby declare the following to be a full, clear, and exact description of the invention, such as will enable others skilled in the art to which it appertains to make and use the same.

My invention relates to an apparatus for retaining heat in foods; and it consists, essentially, of a double-walled vessel of any improved form, preferably cylindrical, the outer wall or casing being constructed of any suitable material, such as wood or indurated fiber, and the inner wall of aluminium and a packing of non-conducting material between the two walls.

The invention further consists of the general arrangement and combination of the several parts, as will be hereinafter fully described, and briefly stated in the claims.

One of the principal objects of the invention is to provide an apparatus of the character mentioned that will retain the heat in food for a considerable length of time and which will be a simple and inexpensive construction and easily kept in a cleanly condition.

As the result of experiment I have found that aluminium possesses the property of absorbing and holding heat in a way which gives it peculiar advantages as a material for constructing the inner wall and other parts of the apparatus. Accordingly I construct the inner wall or cylinder of aluminium and provide a heating-block constructed of soapstone and aluminium.

In the drawings, Figure 1 is a vertical sectional view of my improved apparatus; Fig. 2, a perspective view of the food-rack, and Fig. 3 a similar view of the heater.

Referring to the several views, the numeral 1 indicates an outer cylinder of any suitable material and of any preferred or desired shape, and 2 an inner wall or cylinder of aluminium. The lower end of each cylinder is closed and the inner cylinder is of less diameter and length than the outer cylinder, so as to provide a space $a$ between the walls and closed end of the cylinders, in which is placed a packing of some non-conducting and heat-retaining material. The open end of the packing-space is closed by a detachable ring 3, fitting between the inner and outer walls, and a suitable cover 4, having a flange 5, is adapted to fit over the outer cylinder. The cover is provided with a bottom 6 to form a chamber 7 for the reception of cold desserts, bread, &c. The mouth of the food-containing chamber is provided with a suitable closure 8 and the apparatus is provided with a handle 9, also legs 10. Situated in the bottom of the food-chamber is a heater 11, composed of a soapstone block 12, provided with a cap 13, of aluminium, and supported on the heater is a food-rack 14 made of wire and bent to form a base 15, seat-arms 16, and a top connection 17. The top connection has its projecting ends joined together by a wire 18, and a wire 19, bent to form seat-arms 20, corresponding with the arms 16, is connected to said top connection and the base.

By constructing the inner cylinder of aluminium and the heater of a body of soapstone and a cap or cover of aluminium I produce an apparatus for retaining heat in foods that has superior advantages over similar devices now in use, as the aluminium possesses the essential property of great specific heat and conductivity, so that it absorbs the heat more quickly and readily and releases the same more slowly than any other known material. By experiment it has been found that if a given bulk of aluminium be heated to one degree of heat said amount of heat will be sufficient to raise the same volume of water to twenty-one one-hundredths of a degree, while if the same degree of heat be applied to any other metal it will not be sufficient to raise the temperature of the water to exceed eleven one-hundredths of a degree.

In operation the heat absorbed by the soapstone and aluminium cover is conducted partly to the wall of the inner or aluminium cylinder and partly radiated into the food-chamber. As the heat absorbed by the aluminium cap or cover and the aluminium cylinder will be slowly released, the food-chamber will be maintained in a heated condition for a long time and at such a temperature as will preserve the food unchanged and in proper condition.

Besides its valuable heat-retaining property the apparatus possesses the very essential quality of being easily kept clean and free from odors and is not subject to any of the objectionable features found in many of the devices in common use arising chiefly from imperfect heaters and the property of the inner cylinder for absorbing and retaining odors arising from the food.

What I claim, and desire to secure by Letters Patent, is—

1. A double-walled heat-retaining apparatus, consisting of an outer cylinder or casing of suitable material, an inner cylinder of aluminium, a suitable packing between the walls of the outer and inner cylinders, and a heater situated in the bottom of the inner cylinder, said heater composed of a body of soapstone incased in aluminium, whereby the heat from the aluminium case is conducted to the aluminium cylinder, and radiated into the food-chamber.

2. A double-walled heat-retaining apparatus, consisting of an outer casing of suitable material, an inner cylinder of aluminium, a suitable packing between the walls of the cylinders, and a heater in the bottom of the inner cylinder, said heater composed of a body of soapstone and a cap or covering of aluminium.

3. A double-walled heat-retaining apparatus, consisting of an outer cylinder or casing of suitable material, an inner cylinder of aluminium, a suitable packing between the walls of the outer and inner cylinders, a heater situated in the bottom of the inner cylinder, said heater composed of a body of soapstone incased in aluminium, whereby the heat from the aluminium case is conducted to the aluminium cylinder and radiated into the food-chamber, and a food-rack for supporting dishes or vessels supported upon the heater.

In testimony whereof I affix my signature in the presence of two witnesses.

EDWARD C. KIRK.

Witnesses:
M. P. KIRK,
HERBERT N. MORSE.